W. D. KING.
FLY TRAP.
APPLICATION FILED JUNE 14, 1913.
1,095,886.
Patented May 5, 1914.
2 SHEETS—SHEET 1.
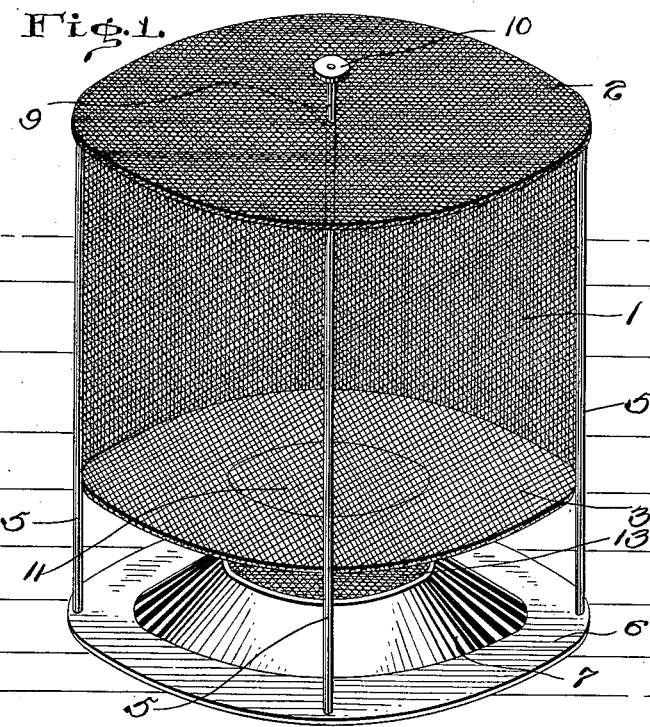
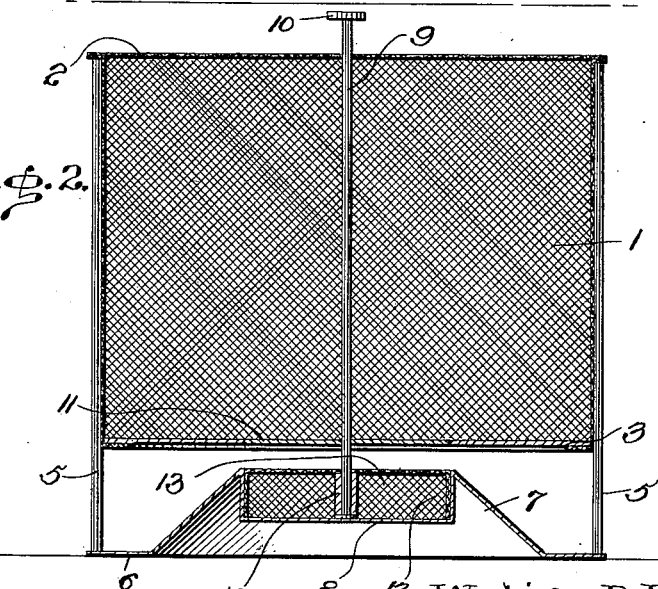
Witnesses
Howard F. Costello
H. B. Vrooman
Inventor
Wylie D. King
By E. E. Vrooman,
his Attorney.
COLUMBIA PLANOGRAPH CO., WASHINGTON, D. C.

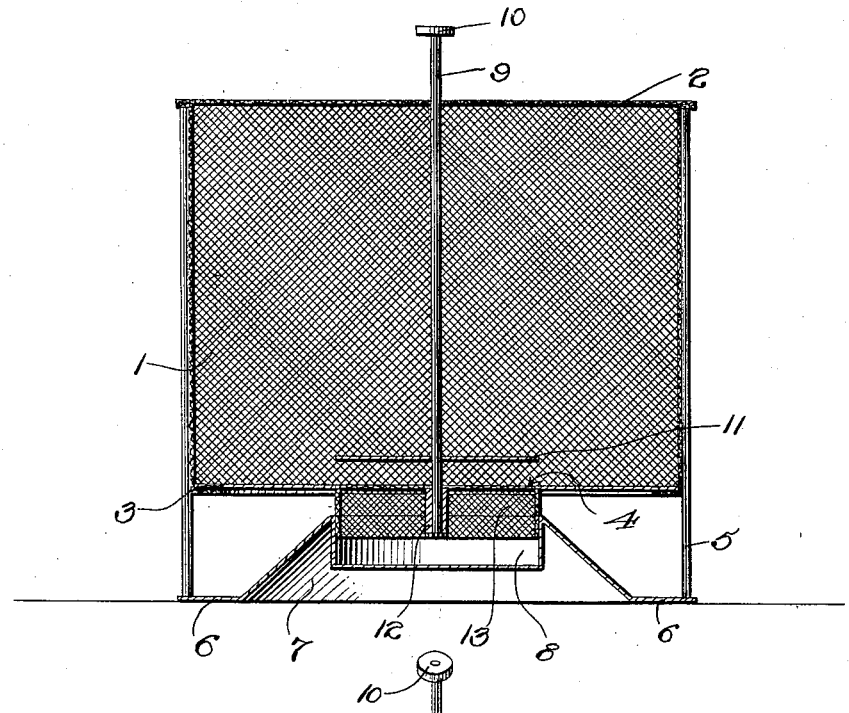
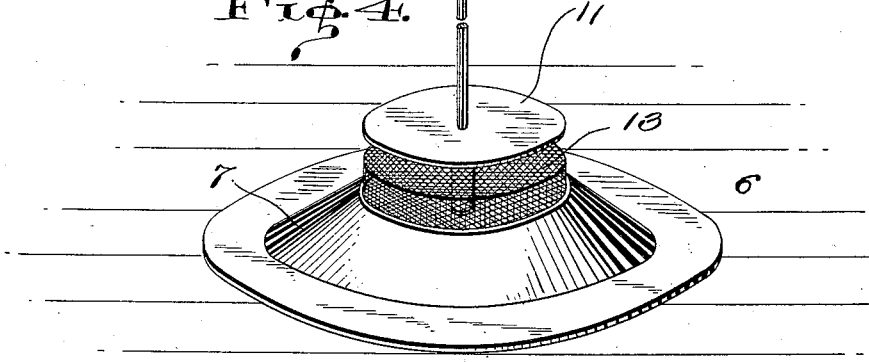

UNITED STATES PATENT OFFICE.

WYLIE D. KING, OF MEDINA, TEXAS.

FLY-TRAP.

1,095,886.      Specification of Letters Patent.      Patented May 5, 1914.

Application filed June 14, 1913. Serial No. 773,698.

*To all whom it may concern:*

Be it known that I, WYLIE D. KING, a citizen of the United States, residing at Medina, in the county of Bandera and State of Texas, have invented certain new and useful Improvements in Fly-Traps, of which the following is a specification, reference being had therein to the accompanying drawing.

This invention relates to a fly trap and has for its object the production of a simple and efficient means for attracting flies in such a position as to allow the same to be placed within the interior of the trap.

Another object of the invention is to provide a trap which is provided with shifting portions adapted to so shift as to place the flies within the interior of the trap.

With these and other objects in view, this invention consists of certain novel combinations, constructions and arrangements of parts as will be hereinafter fully described and claimed.

In the accompanying drawings: Figure 1 is a perspective view of the improved trap. Fig. 2 is a central vertical section of the trap, showing the same in a set position. Fig. 3 is a central vertical section of the device, illustrating how the flies may be placed within the trap. Fig. 4 is a perspective view of the base plate and shifting mechanism.

Referring to the accompanying drawings by numerals 1 indicates the body of the trap which is formed of woven wire and is hollow so as to allow the flies to be placed therein. This body 1 is provided with the wire top 2 and metallic bottom 3, this metallic bottom being provided with a central opening 4. A plurality of standards 5 are fixedly secured to the side of the screen body 1 and extend for a distance below the lower portion of the bottom 4 whereby the body 1 will be held at a spaced distance from a support.

The supporting plate 6 is provided with inclined sides 7 which carry the bowl 8. The standards 5 are positioned upon the plate 6 so as to allow the bowl 8 to be positioned directly beneath the opening 4. When a bait is placed within the bowl 8 the flies will be attracted so as to be positioned directly beneath the opening 4.

In order to shift the flies into the trap there is provided an operating plunger 9 having a knob 10. This operating plunger 9 is provided adjacent its lower end with a round plate 11, this plate 11 being adapted to normally close the opening 4. This rod 9 is also provided at its lower end with a fixedly secured collar 12, this collar 12 being adapted to support the screen housing 13 fitting within the bowl 8. By positioning the screen housing 13 within the bowl 8 the flies will be prevented from having access to the bait carried within the bowl 8, but will be attracted so as to rest upon the upper portion of the screen housing 13.

When this trap is used the bait is placed within the bowl 8 at which time the trap will assume the positions illustrated in Figs. 1 and 2. The flies will then be attracted up the sides 7 so as to alight upon the housing 13. This will cause the flies to be positioned directly below the opening 4 which is closed by the plate 11. By grasping the knob 10 and raising the rod 9, the plate 11 will be lifted so as to allow free passage through the opening 4. As this rod is lifted it will, of course, lift the screen housing 13 which will pass up into the opening 4 as illustrated in Fig. 3. This action may be accomplished very quickly so that the flies will be positioned within the body 1 before they can fly from the screen housing 13. When the housing 13 is positioned within the opening 4, as illustrated in Fig. 3, the flies may then pass from under the plate 11 and into the body 1. As soon as the flies have moved from the upper portion of the housing 13, the rod 9 may be released whereby the housing will again move down into the bowl 8 as illustrated in Fig. 2, whereby the plate 11 will close the opening 4.

From the foregoing description it will be seen that a simple and efficient means has been produced for attracting flies toward the entrance of the trap whereby the fles may be easily positioned within the interior of the trap without allowing any of the flies within the trap to escape.

What is claimed, is:—

1. A fly trap comprising a body, said body provided with a bottom having an opening in its central portion, a base plate having a bait containing bowl positioned beneath said body so as to allow said bow to be positioned beneath said opening, a rod passing through said body and slidably mounted therein, a plate fixedly secured to said rod and adapted to close said opening whereby the flies within said body will be prevented from escaping, and means carried by said rod and shielding said bowl so as to prevent the flies from having access to the bait carried thereby, said rod adapted to move upwardly so as to shift said plate from said opening and move said means up into said opening for placing the flies carried by said means within the trap.

2. A trap comprising a body, said body provided within a bottom having a central opening, a base plate positioned beneath said body and provided with a central bait containing bowl, a rod slidably mounted within said body, said rod provided with a fixedly secured plate adapted to close the opening formed in said bottom, a screen housing carried by the lower portion of said rod and fitting within said bowl for preventing flies from having access to the bait carried thereby, said rod adapted to be moved so as to lift said plate from said opening and move the housing up into said opening for positioning the flies carried thereby within the trap, the lower portion of said housing being positioned within said bowl.

In testimony whereof I hereunto affix my signature in presence of two witnesses.

WYLIE D. KING.

Witnesses:
 C. H. BRADLEY,
 L. P. ATMER.

---

Copies of this patent may be obtained for five cents each, by addressing the "Commissioner of Patents, Washington, D. C."